(12) United States Patent
Taguchi et al.

(10) Patent No.: US 10,286,582 B2
(45) Date of Patent: May 14, 2019

(54) FILM FOR THERMAL COMPRESSION BONDING, WHICH CONTAINS CHOLESTERIC LIQUID CRYSTAL LAYER, AND APPLICATION THEREOF

(71) Applicant: FUJIFILM Corporation, Tokyo (JP)

(72) Inventors: Takao Taguchi, Ashigarakami-gun (JP); Kazuhiro Oki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 361 days.

(21) Appl. No.: 15/088,716

(22) Filed: Apr. 1, 2016

(65) Prior Publication Data

US 2016/0214285 A1 Jul. 28, 2016

Related U.S. Application Data

(63) Continuation of application No. PCT/JP2014/076613, filed on Oct. 3, 2014.

(30) Foreign Application Priority Data

Oct. 4, 2013 (JP) .................................. 2013-208857

(51) Int. Cl.

| | |
|---|---|
| *B29C 43/00* | (2006.01) |
| *B29C 43/18* | (2006.01) |
| *G02B 5/30* | (2006.01) |
| *B32B 27/28* | (2006.01) |
| *B29C 43/56* | (2006.01) |
| *B29C 45/00* | (2006.01) |
| *B29C 45/14* | (2006.01) |
| *B32B 7/06* | (2019.01) |
| *B32B 7/12* | (2006.01) |
| *B32B 27/30* | (2006.01) |
| *B32B 27/36* | (2006.01) |
| *B32B 7/04* | (2019.01) |
| *B32B 27/08* | (2006.01) |
| *B32B 27/32* | (2006.01) |
| *B32B 27/34* | (2006.01) |
| *B32B 27/38* | (2006.01) |

(Continued)

(52) U.S. Cl.
CPC ............ *B29C 43/003* (2013.01); *B29C 43/18* (2013.01); *B29C 43/56* (2013.01); *B29C 45/0001* (2013.01); *B29C 45/14* (2013.01); *B32B 7/04* (2013.01); *B32B 7/06* (2013.01); *B32B 7/12* (2013.01); *B32B 27/08* (2013.01); *B32B 27/28* (2013.01); *B32B 27/283* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 27/38* (2013.01); *B32B 27/40* (2013.01); *G02B 5/30* (2013.01); *G02B 5/3016* (2013.01); *B29C 2043/561* (2013.01); *B29K 2667/003* (2013.01); *B29K 2995/003* (2013.01); *B29K 2995/0034* (2013.01); *B32B 2255/10* (2013.01); *B32B 2255/205* (2013.01); *B32B 2255/26* (2013.01); *B32B 2307/30* (2013.01); *B32B 2307/304* (2013.01); *B32B 2307/40* (2013.01); *B32B 2307/416* (2013.01); *B32B 2307/42* (2013.01); *B32B 2307/50* (2013.01); *B32B 2307/704* (2013.01); *B32B 2551/00* (2013.01); *B32B 2551/08* (2013.01); *C08F 2222/104* (2013.01); *C08F 2222/1013* (2013.01)

(58) Field of Classification Search
None
See application file for complete search history.

(56) References Cited

U.S. PATENT DOCUMENTS

| | | | |
|---|---|---|---|
| 7,022,442 B2 * | 4/2006 | Van De Witte | ... B29C 45/14827 430/17 |
| 8,048,495 B2 | 11/2011 | Tamura | |
| 2009/0117292 A1 | 5/2009 | Tamura | |

FOREIGN PATENT DOCUMENTS

| | | |
|---|---|---|
| EP | 2036969 A1 | 3/2009 |
| EP | 2832821 A1 | 2/2015 |

(Continued)

OTHER PUBLICATIONS

Korean Office Action, dated Mar. 21, 2017, for corresponding Korean Application No. 10-2016-7008849, with English machine translation.

(Continued)

*Primary Examiner* — Monica A Huson
(74) *Attorney, Agent, or Firm* — Birch, Stewart, Kolasch & Birch, LLP

(57) ABSTRACT

The present invention provides a film for thermal compression bonding, which contains a cholesteric liquid crystal layer that is formed by curing a liquid crystal composition including a polymerizable rod-like liquid crystal compound, a chiral agent, and a polymerizable monomer, in which the polymerizable rod-like liquid crystal includes a monofunctional rod-like liquid crystal compound having one polymerizable group and a bifunctional rod-like liquid crystal compound having two polymerizable groups, or two or more bifunctional rod-like liquid crystal compounds having two polymerizable groups, the polymerizable monomer has three or more polymerizable groups, and the polymerizable monomer is contained in an amount of 0.3% by mass to 6.0% by mass with respect to the total mass of the polymerizable rod-like liquid crystal compounds; a method for producing a molded article using the film for thermal compression bonding; and a molded article produced by the production method.

12 Claims, No Drawings

(51) Int. Cl.
*B32B 27/40* (2006.01)
*C08F 222/10* (2006.01)
*B29K 667/00* (2006.01)

(56) References Cited

FOREIGN PATENT DOCUMENTS

| JP | 7-156533 A | 6/1995 |
|---|---|---|
| JP | 7-276777 A | 10/1995 |
| JP | 2003-532565 A | 11/2003 |
| JP | 2008-250187 A | 10/2008 |
| WO | WO 01/85472 A1 | 11/2001 |
| WO | WO 2007/142206 A1 | 12/2007 |
| WO | WO 2013/146923 A1 | 10/2013 |

OTHER PUBLICATIONS

Japanese Office Action issued in Japanese Application No. 2013-208857 dated Sep. 5, 2017, together with an English translation.
Japanese Office Action, dated Jan. 31, 2017, for corresponding Japanese Application No. 2013-208857, along with a machine translation.
International Preliminary Report on Patentability and Written Opinion of the International Searching Authority (PCT/IB/373, PCT/ISA/237, PCT/IB/338, and PCT/IB/326), dated Apr. 14, 2016, for International Application No. PCT/JP2014/076613, along with English translations.
Extended European Search Report for European Application No. 14850409.5, dated Aug. 30, 2016.
International Search Report (PCT/ISA/210) issued in PCT/JP2014/076613, dated Dec. 22, 2014.
Written Opinion (PCT/ISA/237) issued in PCT/JP2014/076613, dated Dec. 22, 2014.
Chinese Office Action and Search Report for Chinese Application No. 201480054574.5, dated Jun. 28, 2017, with an English translation of the Chinese Office Action.
Chinese Office Action, dated Feb. 2, 2018, for corresponding Chinese Application No. 201480054574.5, along with an Englsih translation.

\* cited by examiner

US 10,286,582 B2

FILM FOR THERMAL COMPRESSION BONDING, WHICH CONTAINS CHOLESTERIC LIQUID CRYSTAL LAYER, AND APPLICATION THEREOF

CROSS-REFERENCE TO RELATED APPLICATIONS

This application is a continuation of PCT International Application No. PCT/JP2014/076613 filed on Oct. 3, 2014, which claims priority under 35 U.S.C § 119 (a) to Japanese Patent Application No. 2013-208857 filed on Oct. 4, 2013, the entire content of which is incorporated herein by reference.

BACKGROUND OF THE INVENTION

1. Field of the Invention

The present invention relates to a film for thermal compression bonding, which contains a cholesteric liquid crystal layer, a molded article using the film, and a method for producing a molded article using the film.

2. Description of the Related Art

It is known that a resin film such as a PET film is mounted and heated in a mold for molding, and then processed into a desired shape in the related art. For example, it is possible to produce a product having a resin film having a curved surface transferred onto the surface thereof by applying heat or pressure to a resin film bonded to a plate of vinyl chloride, polycarbonate, or the like with an adhesive, and to the plate. Further, in-mold molding is known as a molding method which makes it possible to carry out the transfer of a resin film onto the surface of an injection-molded article within a mold at the same time as the injection molding by inserting the resin film thereinto when plastics, ceramics, or compounds are injection-molded, and the in-mold molding is employed when an image, photos, or the like is transferred to the surface of a product. JP2003-532565A describes that a patterned decorative cholesteric liquid crystal layer is provided on the surface of an article by an in-mold molding method.

SUMMARY OF THE INVENTION

The present invention has an object to provide a film including a cholesteric liquid crystal layer, which is appropriate for thermal compression bonding. More specifically, the present invention has an object to provide a film including a cholesteric liquid crystal layer, in which the optical characteristics based on the cholesteric liquid crystal layer are hardly changed even when thermal compression processing is carried out, and damage such as cracks due to processing or wrinkles hardly occur. The present invention has another object to provide a molded article using the film, and a method for producing the molded article.

Cholesteric liquid crystal layers are known to have circularly polarized light-selective reflectivity, and are widely used in various optical elements such as a light reflective film, taking advantage of such characteristics. The present inventors have carried out in-mold molding by using a film including a cholesteric liquid crystal layer in order to produce a molded article exhibiting light reflection based on the cholesteric liquid crystal layer. However, they have faced a problem in that the obtained molded article does not exhibit the optical characteristics as designed with the cholesteric liquid crystal layer before the in-mold molding. In JP2003-532565A, since a cholesteric liquid crystal layer is used as a decorative pattern, such a problem could not be perceived. The present inventors have repeatedly conducted investigations, and as a result, can see that the problem is derived from elution of uncured materials in the cholesteric liquid crystal layer into an adhesive layer provided on the surface under the conditions of a high temperature and a high pressure, due to heating or pressing. That is, it is thought that as the uncured materials such as a chiral agent are eluted, the cholesteric liquid crystal layer is crushed and the helical pitch in the cholesteric liquid crystal layer becomes narrow, and accordingly, the circularly polarized light-selective reflection wavelength is shifted to the short wavelength side.

In addition, since molding with respect to a shape having a curved surface is also carried out in in-mold molding or the like, the molding also faced a problem of damage such as cracks, or wrinkles occurring in the film. Further, in order to solve these problems, the present inventors have found a film appropriate for thermal compression bonding, which contains a cholesteric liquid crystal layer, through trial and error in the composition or the preferred physical properties for forming a cholesteric liquid crystal layer, thereby completing the present invention, based on the findings.

That is, the present invention provides [1] to [16] below.

[1] A film for thermal compression bonding, including a cholesteric liquid crystal layer that is formed by curing a liquid crystal composition including a polymerizable rod-like liquid crystal compound, a chiral agent, and a polymerizable monomer, in which the polymerizable rod-like liquid crystal compound includes a monofunctional rod-like liquid crystal compound having one polymerizable group and a bifunctional rod-like liquid crystal compound having two polymerizable groups, or two or more bifunctional rod-like liquid crystal compounds having two polymerizable groups, the polymerizable monomer has three or more polymerizable groups, and the polymerizable monomer is contained in an amount of 0.3% by mass to 6.0% by mass with respect to the total mass of the polymerizable rod-like liquid crystal compounds.

[2] The film for thermal compression bonding as described in [1], further including a support, in which the support is a plastic film selected from the group consisting of polyester, an acrylic resin, an epoxy resin, polyurethane, polyamide, polyolefin, a cycloolefin polymer, a cellulose derivative, and silicone.

[3] The film for thermal compression bonding as described in [2], in which the support is polyethylene terephthalate.

[4] The film for thermal compression bonding as described in [2] or [3], including the cholesteric liquid crystal layer and the support.

[5] The film for thermal compression bonding as described in any one of [1] to [4], further including an alignment layer, in which the alignment layer is selected from the group consisting of polyimide, polyvinyl alcohol, polyester, polyarylate, polyamideimide, polyether imide, polyamide, and modified polyamide.

[6] The film for thermal compression bonding as described in [5], including the support, the alignment layer, and the cholesteric liquid crystal layer.

[7] The film for thermal compression bonding as described in any one of [1] to [6], in which the chiral agent is a left-turning or right-turning chiral agent having an HTP of 30 $\mu m^{-1}$ Or more.

[8] The film for thermal compression bonding as described in any one of [1] to [7], further containing an adhesive layer, in which the adhesive layer is directly in contact with the cholesteric liquid crystal layer.

[9] A method for producing a resin molded article, including: preparing a film having an adhesive coated on at least one surface of the film for thermal compression bonding as described in any one of [1] to [7], inserting the film having the adhesive coated thereon into the mold of an injection molding device, injecting resin into the mold of the injection molding device to be directly applied on the surface side having the adhesive coated thereon, and heating and compressing the film for thermal compression bonding and the resin with the injection molding device.

[10] A method for producing a resin molded article, including: preparing a film having an adhesive coated on at least one surface of the film for thermal compression bonding as described in any one of [1] to [7], adhering the film for thermal compression bonding to a resin plate on the surface having the adhesive coated thereon, and heating and compressing the film for thermal compression bonding and the resin plate with a mold or pressurized air.

[11] The production method as described in [9] or [10], in which the resin is an acrylic resin or polycarbonate.

[12] A resin molded article having a cholesteric liquid crystal layer on the surface thereof, obtained by the production method as described in any one of [9] to [11].

[13] The resin molded article as describe in [12], used as a filter for a sensor, a half mirror, a heat-insulating sheet, or a UV-cut sheet.

[14] A method for producing a resin molded article, including: preparing a film having an adhesive coated on at least one surface of the film for thermal compression bonding as described in any one of [1] to [7], adhering the film for thermal compression bonding to a metal plate on the surface having the adhesive coated thereon, and heating and compressing the film for thermal compression bonding and the metal plate with a mold or pressurized air.

[15] A molded article having a cholesteric liquid crystal layer on the surface thereof, obtained by the production method as described in [14].

[16] The molded article as describe in [15], used as a filter for a sensor, a half mirror, a heat-insulating sheet, or a UV-cut sheet.

According to the present invention, a film including a cholesteric liquid crystal layer, which is appropriate for thermal compression bonding, is provided. In the film of the present invention, the optical characteristics based on the cholesteric liquid crystal layer are hardly changed, and damage or wrinkles also hardly occur even with use of a production method including thermal compression such as in-mold molding. By using the film of the present invention, it is possible to produce a molded article such as a resin product having a desired shape having light reflectivity, it is possible to produce the molded article at lower cost than in a method for preparing a reflective layer, for example, by depositing inorganic materials, and it is also possible to provide the molded article as a product having radio wave transmissibility.

DESCRIPTION OF THE PREFERRED EMBODIMENTS

Hereinafter, the present invention will be described in detail.

Moreover, in the present specification, "(a value) to ~(a value)" is used to mean a range including the numeral values represented before and after the description as a lower limit value and an upper limit value, respectively.

In the present specification, the description of "(meth) acrylate" represents "either or both of acrylate, and methacrylate", which shall apply to "(meth)acrylic acid".

In the present specification, reference to being "selective" to circularly polarized light means that any one light quantity of a right-circularly polarized component or a left-circularly polarized component of light is more than that of the other circularly polarized component. Specifically, reference to being "selective", the degree of circular polarization of light is preferably 0.3 or more, more preferably 0.6 or more, and still more preferably 0.8 or more. Substantially, the circular polarization is even still more preferably 1.0. Here, the degree of circular polarization refers to a value represented by $|I_R-I_L|/(I_R+I_L)$ when the intensity of the right-circularly polarized component is defined as $I_R$ and the intensity of the left-circularly polarized component is defined as $I_L$.

In the present specification, reference to the "sense" with respect to circularly polarized light means right-circular polarization or left-circular polarization. With regard to the sense of the circularly polarized light, in the case where the light is viewed in a direction in which it comes straight toward a viewer, if the leading end of the electric field vector turns clockwise with the passage of time, this is defined as right-circular polarization, whereas if the leading end turns counterclockwise, this is defined as left-circular polarization.

In the present specification, a term "sense" may be used with respect to the twisted direction of helix of the cholesteric liquid crystal in some cases. In the selective reflection by the cholesteric liquid crystal, in the case where the twisted direction of helix (sense) of the cholesteric liquid crystal is right-handed, right-circularly polarized light is reflected and left-circularly polarized light is allowed to pass through, and in the case where the sense is left-handed, left-circularly polarized light is reflected and right-circularly polarized light is allowed to pass through.

Moreover, the polarization state of each wavelength of light can be measured using a spectral emission luminance meter or a spectrometer on which a circularly polarizing plate is mounted. In this case, the intensity of the light measured through a right-circularly polarizing plate corresponds to $I_R$, and the intensity of the light measured through a left-circularly polarizing plate corresponds to $I_L$. Moreover, ordinary light sources such as an incandescent light bulb, a mercury lamp, a fluorescent lamp, and an LED practically emit natural light, but the characteristics of the circularly polarizing plate, which is mounted on the above sources, causing polarization of the polarization state control member can be measured using, for example, a polarization phase difference analyzer AxoScan manufactured by AXO-METRICS, Inc.

Incidentally, the polarization state can also be measured by attaching a circularly polarizing plate in an illuminometer or a light spectrometer. By attaching a right-circularly polarized light transmitting plate and measuring a right-circularly polarized light quantity, and also, attaching a left-circularly polarized light transmitting plate and measuring a left-circularly polarized light quantity, the ratio can be measured.

In the present specification, the light intensity required with respect to calculation of a light reflectance or a light transmittance can be measured by any means as long as it is measured by using, for example, ordinary visible light or near-infrared spectrometer.

(Film for Thermal Compression Bonding)

The film for thermal compression bonding means a film which is used as a raw material film for a processing including a step involving heating or pressurizing, or heating and pressurizing. The film for thermal compression bonding is a concept encompassing a film for heat transfer (with a support being peeled after molding), a film for heat laminating (with a support not being peeled after molding), and specific examples of the film for thermal compression bonding include a film for in-mold molding, a film for vacuum/pressurized air molding, and a film for matched die molding.

The film for thermal compression bonding of the present invention includes a cholesteric liquid crystal layer, and if desired, may further include a support and other layers such as an alignment layer and an adhesive layer.

The film for thermal compression bonding of the present invention may have a small shift in the selective reflection wavelength of the cholesteric liquid crystal layer even under a high temperature and a high pressure. Further, the film for thermal compression bonding of the present invention has less wrinkles, damage, or the like even under a high temperature and a high pressure.

Specifically, the film for thermal compression bonding of the present invention may have a tensile elongation as a film for thermal compression bonding of 5% to 40%, preferably 10% to 30%, and more preferably 12% to 25%. The tensile elongation can be measured in accordance with a tensile test (ASTMD 882) for a thin plastic sheet.

(Cholesteric Liquid Crystal Layer)

The cholesteric liquid crystal layer is obtained by curing a liquid crystal composition including a polymerizable liquid crystal compound. In the cholesteric liquid crystal layer, a cholesteric liquid crystal phase is fixed by a polymerization reaction due to a polymerizable group of the polymerizable liquid crystal compound, or the like.

The cholesteric liquid crystal phase is known to exhibit circularly polarized light-selective reflection, in which the phase reflects any one of right-circularly polarized light and left-circularly polarized light selectively while transmitting the other circularly polarized light. Many of cholesteric liquid crystal compounds exhibiting circularly polarized light-selective reflectivity, or films formed of the cholesteric liquid crystal compounds have been known in the related art, and reference to the related art thereof can be made with regard to the selection or manufacture of a cholesteric liquid crystal layer.

In the cholesteric liquid crystal layer, an alignment of a liquid crystal compound formed of a cholesteric liquid crystal phase is maintained. Typically, the cholesteric liquid crystal layer may be any layer as long as it is changed into a state where a layer not having fluidity is formed by deriving a polymerizable liquid crystal compound into the alignment state of a cholesteric liquid crystal phase, followed by polymerization and curing under irradiation with ultraviolet rays, heating, or the like while a change in the alignment form does not occur by an external field or an external force. Further, the cholesteric liquid crystal layer is sufficiently met as long as the optical properties of the cholesteric liquid crystal phase are maintained in the layer, and the liquid crystal compound in the layer may not exhibit liquid crystallinity any longer. For example, the polymerizable liquid crystal compound may have an increased molecular weight by the curing reaction, and thus may already lose the liquid crystallinity.

In the present specification, the cholesteric liquid crystal layer may be referred to as a liquid crystal layer in some cases.

The cholesteric liquid crystal layer exhibits circularly polarized light-selective reflection due to a helical structure of the cholesteric liquid crystal. A central wavelength $\lambda$ of the reflection depends on a pitch length P (equal to the period of a helix) of the helical structure in the cholesteric liquid crystal phase, and follows the relationship between an average refractive index n of the cholesteric liquid crystal phase and $\lambda = n \times P$. Therefore, by controlling the pitch length of the helical structure, a wavelength exhibiting a circular polarization reflection can be adjusted. The pitch length of the cholesteric liquid crystal phase depends on the kind of a chiral agent used in combination with a polymerizable liquid crystal compound, or the addition concentration thereof, and can thus be represented by $P=1/(\beta \cdot c)$. Here, c is the concentration of a chiral agent, and $\beta$ is an index of a force with which the chiral agent twists a liquid crystal, and referred to as a Helical Twisting Power (HTP). HTP can be calculated using an equation of $HTP=n/(\lambda \times 0.01 \times C)$, from the selective reflection wavelength $\lambda$ and the average refractive index n of a cholesteric liquid crystal layer formed of a liquid crystal composition including a chiral agent and a rod-like liquid crystal compound, and the addition concentration C (% by mass) of the chiral agent.

A desired pitch length can be obtained by adjusting those. Further, as a method for measuring the sense or pitch of a helix, the method described in "Easy Steps in Liquid Crystal Chemistry Experiment" p. 46, edited by The Japanese Liquid Crystal Society, Sigma Publishing, published in 2007, and "Liquid Crystal Handbook", p. 196, Editorial Committee of Liquid Crystal Handbook, Maruzen can be used.

For the half-width of the circularly polarized light-selective reflection band, $\Delta\lambda$ depends on the birefringence $\Delta n$ of a liquid crystal compound and the pitch length P, and follows the relationship of $\Delta\lambda = \Delta n \times P$. Therefore, the control of the width of the selective reflection band can be carried out by adjusting $\Delta n$. The adjustment of $\Delta n$ can be carried out by adjusting the kind or mixing ratio of polymerizable liquid crystal compounds, or adjusting the temperature at the time of alignment fixing.

Particularly, in the film for thermal compression bonding of the present invention, the kinds or mixing ratios of polymerizable liquid crystal compounds, the kinds or mixing ratios of polymerizable monomers, the kind or concentration of a chiral agent, and the like may be controlled such that the central wavelength $\lambda$ and the half-width of the circularly polarized light-selective reflection of the cholesteric liquid crystal layer derived from the helical structure of a cholesteric liquid crystal is hardly changed (shifted) at the time of thermal compression bonding of the film.

The sense of the reflected, circularly polarized light of the cholesteric liquid crystal layer is identical to that of the helix.

In the film of the present invention, the sense of the helix may use a cholesteric liquid crystal layer on either left-hand or right-hand side. The reflectance at a reflection wavelength becomes larger as the cholesteric liquid crystal layer is thicker, but ordinary liquid crystal materials are saturated at a thickness of 2 µm to 8 µm in the visible light wavelength band. For the purpose of increasing the selectivity to circularly polarized light at a specific wavelength, or the like, a plurality of cholesteric liquid crystal layers may be laminated, for which cholesteric liquid crystal layers having the same period P and the same sense of the helix may be laminated. Further, in order to form a layer having reflectivity with respect to natural light (non-polarized light) at a specific wavelength, a plurality of cholesteric liquid crystal layers may be laminated, for which cholesteric liquid crystal layers having the same period P and different senses of the helix may be laminated.

Moreover, since the width of the circularly polarized light-selective reflection wavelength band is 15 nm to 100 nm with an ordinary material in the visible light region, the bandwidth of the reflection can be widened by laminating cholesteric liquid crystal layers having different central wavelengths of the reflection light with the period P being changed. Here, it is preferable that cholesteric liquid crystal layers having the same sense of a helix are laminated. In addition, in one cholesteric liquid crystal layer, the bandwidth of the reflection can be widened by slowly changing the period P with respect to the film thickness direction.

When the cholesteric liquid crystal layers are laminated, a plurality of cholesteric liquid crystal layers which are separately manufactured may be bonded to each other with an adhesive, or a liquid crystal composition including a polymerizable liquid crystal compound and the like may be directly coated on the surface of a cholesteric liquid crystal layer which has been prepared in advance, followed by steps of alignment and fixation, to form the next cholesteric liquid crystal layer.

(Method for Manufacturing Cholesteric Liquid Crystal Layer)

For the formation of the cholesteric liquid crystal layer, a liquid crystal composition including a polymerizable rod-like liquid crystal compound and a polymerizable monomer can be used. If desired, the liquid crystal composition, which has been further mixed with a chiral agent (optically an active compound), a polymerization initiator, an alignment control agent, and the like and then dissolved in a solvent or the like, may be coated on a base material (a support, an alignment layer, a cholesteric liquid crystal layer which will become an underlayer, or the like), aged, and then fixed to form a cholesteric liquid crystal layer.

Polymerizable Rod-Like Liquid Crystal Compound

Examples of the polymerizable rod-like liquid crystal compound for forming a cholesteric liquid crystal layer include a rod-like nematic liquid crystal compound. As the rod-like nematic liquid crystal compound, azomethines, azoxy compounds, cyanobiphenyls, cyanophenyl esters, benzoic esters, phenyl cyclohexanecarboxylic esters, cyanophenylcyclohexanes, cyano-substituted phenylpyrimidines, alkoxy-substituted phenylpyrimidines, phenyldioxanes, tolanes, and alkenylcyclohexylbenzonitriles are preferably used. Not only low-molecular liquid crystal compounds but also high-molecular liquid crystal compounds can also be used.

The polymerizable liquid crystal compound is obtained by introducing a polymerizable group into a liquid crystal compound. Examples of the polymerizable group include an unsaturated polymerizable group, an epoxy group, and an aziridinyl group. The unsaturated polymerizable group is preferable, and the ethylenically unsaturated polymerizable group is particularly preferable. The polymerizable group may be introduced into the molecule of a cholesteric liquid crystal compound in various methods. The number of the polymerizable groups contained in the polymerizable liquid crystal compound is preferably 1 to 6, and more preferably 1 to 3. Examples of the polymerizable cholesteric liquid crystal compound includes the compounds described in Makromol. Chem., Vol. 190, p. 2255 (1989); Advanced Materials, Vol. 5, p. 107 (1993); U.S. Pat. Nos. 4,683,327A, 5,622,648A, and 5,770,107A; WO95/22586A, WO95/24455A, WO97/00600A, WO98/23580A, and WO98/52905A; JP1989-272551A (JP-H01-272551A), JP1994-16616A (JP-H06-16616A), JP1995-110469A (JP-H07-110469A), JP1999-80081A (JP-H11-80081A), JP2001-328973A, and the like, the contents of which are each hereby incorporated by reference. Two or more kinds of polymerizable liquid crystal compounds may be used as combined. When two or more kinds of polymerizable liquid crystal compounds are used as combined, the alignment temperature can be lowered.

The polymerizable liquid crystal compound may include a bifunctional liquid crystal compound having two polymerizable groups and a monofunctional liquid crystal compound having one polymerizable group, or may include two bifunctional liquid crystal compounds having two polymerizable groups. In the case where the bifunctional liquid crystal compound and the monofunctional liquid crystal compound are included, the mass ratio of the two compounds (polyfunctional liquid crystal compound/monofunctional liquid crystal compound) can be any value in the range from 30/70 to 99/1, and preferably 70/30 to 90/10. By using a liquid crystal composition including such a polymerizable liquid crystal compound and the polymerizable monomer which will be described later, the central wavelength X or the half-width thereof of the circularly polarized light-selective reflection of the cholesteric liquid crystal layer is hardly changed (shifted) at the time of thermal compression bonding of a film, and further, it becomes possible to follow processing such as forming curved surfaces without breakage at the same time of thermal compression bonding.

Moreover, the addition amount of the polymerizable liquid crystal compound in the liquid crystal composition is preferably 50% by mass to 99% by mass, more preferably 70% by mass to 98% by mass, and particularly preferably 80% by mass to 95% by mass, with respect to the mass of the solid content (the mass excluding a solvent) of the liquid crystal composition.

Polymerizable Monomer

The polymerizable monomer may be a polymerizable monomer having three or more tri- or higher functional polymerizable groups. Further, the polymerizable monomer may be a UV curable monomer which undergoes a polymerization reaction by irradiation with UV. Since the addition amount is small, the polymerizable monomer may or may not exhibit liquid crystallinity. As the liquid crystal compound, a liquid crystal having a tri- or higher functional polymerizable group, for example, a swallow tail-type liquid crystal compound is preferable.

In addition, the kinds of the polymerizable functional groups of the tri- or higher functional polymerizable monomer may each be independently different kinds of polymerizable functional groups from each other. Alternatively, two or more polymerizable functional groups which are the same as each other may be included. Among these, polymerizable functional groups in which all the kinds of polymerizable functional groups included in the tri- or higher functional polymerizable monomer be the same as each other are preferable.

The number of the polymerizable functional groups of the tri- or higher functional polymerizable monomer is not particularly limited, but the polymerizable functional groups are preferably tri- to decafunctional, more preferably tri- to hexafunctional, and particularly preferably tri- to tetrafunctional.

The structure other than the polymerizable functional group of the tri- or higher functional polymerizable monomer is not particularly limited, but a linear or branched structure is preferable (that is, not including a cyclic structure), and a branched structure is more preferable.

The kinds of polymerizable functional group of the tri- or higher functional polymerizable monomer are not particularly limited within a range not departing from the gist of the present invention, and for example, the following polymerizable functional groups can be exemplified:

a (meth)acryloyl group, a vinyl ether group, an epoxide group, an oxetane group, a carboxyl group, a sulfonic acid group, a thiirane group, an aziridine group, an isocyanate group, and an isothiocyanate group.

Among those, the polymerizable functional group of the tri- or higher functional polymerizable monomer is more preferably a (meth)acryloyl group from the viewpoint of the level of reactivity of the obtained film, and is particularly preferably an acryloyl group.

Further, in the present specification, a "monomer material" and a "monomer" have the same definition as each other. The monomer in the present specification refers to a compound which is distinguished from an oligomer or a polymer and has a mass average molecular weight of 1,000 or less.

Specific examples of the tri- or higher functional (meth) acrylate monomer will be described below, but the present invention is not limited to the following examples:

Examples include: epichlorohydrin (hereinafter, referred to as "ECH")-modified glycerol tri(meth)acrylate, ethylene oxide (hereinafter referred to as "EO")-modified glycerol tri(meth)acrylate, propylene oxide (hereinafter referred to as "PO")-modified glycerol tri(meth)acrylate, pentaerythritol tri(meth)acrylate, EO-modified phosphoric acid tri(meth) acrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, dipentaerythritol hexa(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol hexa(meth)acrylate, alkyl-modified dipentaerythritol tri(meth)acrylate, ditrimethylolpropane tetra(meth)acrylate, pentaerythritol ethoxytetra(meth)acrylate, and pentaerythritol tetra(meth) acrylate.

Among these, EO-modified trimethylolpropane tri(meth) acrylate, dipentaerythritol hexa(meth)acrylate, and pentaerythritol tetra(meth)acrylate are more preferable, EO-modified trimethylolpropane tri(meth)acrylate, dipentaerythritol hexa(meth)acrylate, and pentaerythritol tetra(meth)acrylate are particularly preferable, and acrylate of these compounds is more particularly preferable.

On the other hand, specific examples of the tri- or higher functional polymerizable monomer used for the present invention other than the tri- or higher functional (meth) acrylate monomer will be described below, but the present invention is not limited to the aspects.

ECH-modified glycerol triacrylate, EO-modified glycerol triacrylate, EO-modified phosphoric acid triacrylate, HPA (heteropoly acid)-modified trimethylol propane triacrylate, trimethylol propane triacrylate, caprolactone-modified trimethylolpropane triacrylate, PO-modified trimethylolpropane triacrylate, trimethylol propane benzoate acrylate, alkoxy-modified trimethylol propane triacrylate, caprolactone-modified dipentaerythritol hexaacrylate, dipentaerythritol hydroxypentaacrylate, alkyl-modified dipentaerythritol pentaacrylate, dipentaerythritol polyacrylate, ditrimethylolpropane tetraacrylate, pentaerythritol ethoxytetraacrylate, silicone hexaacrylate, and lactone-modified flexible acrylate.

The polymerizable monomers may be used alone or in combination of two or more kinds thereof.

The content of the tri- or higher functional polymerizable monomer is 0.3% by mass to 6% by mass, more preferably 0.4% by mass to 5% by mass, and particularly preferably 0.5% by mass to 2% by mass, with respect to the total amount of the liquid crystal compound included in the liquid crystal composition. Particularly, it is preferable that the content of the tri- or higher functional polymerizable monomer is lower than or equal to the upper limit with respect to the total amount of the liquid crystal compound included in the liquid crystal composition, from the viewpoint of not causing breakage or wrinkling during the transfer to the curved surface while not deteriorating the curved surface-following properties of the cholesteric liquid crystal layer, and from a viewpoint of maintaining the reflection bandwidth while not deteriorating the liquid crystallinity. On the other hand, it is preferable that the content of the tri- or higher functional polymerizable monomer is higher than or equal to the lower limit with respect to the total amount of the liquid crystal compound included in the liquid crystal composition from a viewpoint of sufficiently acquiring effects of suppressing the change in the reflection bandwidth of the cholesteric liquid crystal layer of the obtained film.

The liquid crystal composition can improve the productivity while improving the film strength and the durability by a catalyst which may include a known catalyst, depending on the reactivity of the polymerizable monomer.

Chiral Agent (Optically Active Compound)

A chiral agent has a function of generating a helical structure of a cholesteric liquid crystal phase. The chiral compound may be selected according to the purpose since the senses of a helix or the helical pitches generated by the compounds are different from each other.

The chiral agent is not particularly limited, and a known compound (for example, those described in Liquid Crystal Device Handbook, Chap. 3, Section 4-3, Chiral agent for TN, STN, p 199, edited by Japan Society for the Promotion of Science, No. 142 Committee, 1989), isosorbide or an isomannide derivative can be used.

The chiral agent generally contains an asymmetric carbon atom, but an axially asymmetric compound or a planarly asymmetric compound which does not contain an asymmetric carbon atom can also be used as the chiral compound. Examples of the axially asymmetric compound or the planarly asymmetric compound include binaphthyl, helicene, paracyclophane, and derivatives thereof. The chiral agent may have a polymerizable group. In the case where the chiral agent and the curable cholesteric liquid crystal compound have a polymerizable group, a polymer having a repeating unit derived from the cholesteric liquid crystal compound and the repeating unit derived from the chiral agent can be formed by the polymerization reaction of the polymerizable chiral agent and the polymerizable cholesteric liquid crystal compound. In this aspect, the polymerizable group which the polymerizable chiral agent has is preferably the same group as the polymerizable group which the polymerizable cholesteric liquid crystal compound has. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

Furthermore, the chiral agent may be a liquid crystal compound.

In the case where the chiral agent has a photoisomerization group, a pattern of an intended reflection wavelength corresponding to an emission wavelength can be formed by application and alignment, followed by photomask irradiation with an active ray or the like, which is preferable. As the photoisomerization group, an isomerization site of a compound exhibiting a photochromic property, azo, azoxy, and a cinnamoyl group are preferable. As a specific compound, the compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, or JP2003-313292A can be used.

As a chiral agent, a left-turning or right-turning chiral agent having an HTP of 30 $\mu m^{-1}$ or more is preferably used. The HTP of the right-turning chiral agent is preferably 40 $\mu m^{-1}$ or more, and more preferably 50 $\mu m^{-1}$ or more. The HTP of the left-turning chiral agent is preferably 33 $\mu m^{-1}$ or more, and more preferably 35 $\mu m^{-1}$ or more.

The content of the chiral agent in the liquid crystal composition is preferably 0.3% by mass to 30% by mass, and more preferably 1% by mass to 15% by mass, with respect to the amount of the polymerizable liquid crystal compound.

Polymerization Initiator

The liquid crystal composition preferably contains a polymerization initiator. In an embodiment in which a polymerization reaction proceeds by irradiation with ultraviolet rays, the polymerization initiator to be used is preferably a photopolymerization initiator which is capable of initiate a polymerization reaction by irradiation with ultraviolet rays. Examples of the photopolymerization initiator include α-carbonyl compounds (described in each of U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combination of a triarylimidazole dimer and a p-aminophenyl ketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content of the photopolymerization initiator in the liquid crystal composition is preferably 0.1% by mass to 20% by mass, and more preferably 0.5% by mass to 5% by mass, with respect to the content of the polymerizable liquid crystal compound.

Alignment Control Agent

An alignment control agent that contributes to stably or rapidly serving as a cholesteric liquid crystal layer of a planar alignment may be added to the liquid crystal composition. Examples of the alignment control agent include the fluorine-containing (meth)acrylate-based polymers described in JP2007-272185A, and the like, and the compounds represented by Formulae (I) to (IV), described in JP2012-203237A, the contents of which are each hereby incorporated by reference.

Further, the alignment control agents may be used alone or in combination of two or more kinds thereof.

The addition amount of the alignment control agent in the liquid crystal composition is preferably 0.01% by mass to 10% by mass, more preferably 0.01% by mass to 5% by mass, and particularly preferably 0.02% by mass to 1% by mass, with respect to the total mass of the cholesteric liquid crystal compound.

Other Additives

In addition, the liquid crystal composition may contain at least one selected from various additives such as a surfactant for making the film thickness uniform by adjusting the surface tension of a coated film, and a polymerizable monomer. Further, if desired, a polymerization inhibitor, an antioxidant, an ultraviolet absorbent, a light stabilizer, a coloring materials, fine metal oxide particles, and the like may be further added to the liquid crystal composition within a range not detracting from the optical performance of the film.

As for the cholesteric liquid crystal layer, the cholesteric liquid crystal layer in which cholesteric regularity is fixed can be formed by coating a liquid crystal composition obtained by dissolving a polymerizable liquid crystal compound, a polymerizable monomer, and a chiral agent, and a polymerization initiator, a surfactant, and the like which are further added, if desired, in a solvent on a support or an alignment layer on the support; drying the same to obtain a coated film; and irradiating the coated film with actinic rays to polymerize the cholesteric liquid crystalline composition. Further, a laminated film including a plurality of cholesteric liquid crystal layers can be formed by repeating the step of producing a cholesteric liquid crystal layer.

The solvent used for preparing the cholesteric liquid crystal composition is not particularly limited and can be appropriately selected in accordance with the purpose, and an organic solvent is preferably used.

The organic solvent is not particularly limited and can be appropriately selected in accordance with the purpose. Examples thereof include ketones, alkyl halides, amides, sulfoxides, heterocyclic compounds, hydrocarbons, esters, and ethers. These may be used alone or in combination of two or more kinds thereof. Among these, ketones are particularly preferable in the case of considering a load on the environment.

The method for coating the liquid crystal composition onto a support, an alignment layer, or the like is not particularly limited, and can be appropriately selected in accordance with the purpose, and examples thereof include a wire bar coating method, a curtain coating method, an extrusion coating method, a direct gravure coating method, a reverse gravure coating method, a die coating method, a spin coating method, a dip coating method, a spray coating method, and a slide coating method. Further, coating can also be carried out by transferring the liquid crystal composition coated separately on a support onto a base material. By heating the coated liquid crystal composition, the liquid crystal molecules are aligned. The heating temperature is preferably 200° C. or lower, and more preferably 130° C. or lower. By the alignment treatment, an thin optical film in which a polymerizable liquid crystal compound is in a twisted-alignment state so as to have a helical axis in a direction substantially perpendicular to the surface of the film surface is obtained.

The aligned liquid crystal compound may further be polymerized. Examples of the polymerization method include photopolymerization (ultraviolet ray polymerization), radiation polymerization, electron beam polymerization, and thermopolymerization, and any of these is available but photopolymerization is preferable. For the light irradiation, ultraviolet rays are preferably used. The irradiation energy is preferably 20 $mJ/cm^2$ to 50 $J/cm^2$, and more preferably 100 $mJ/cm^2$ to 1,500 $mJ/cm^2$. In order to accelerate the photopolymerization reaction, the light irradiation may be carried out under a heated condition or a nitrogen atmosphere. The wavelength of ultraviolet rays to be irradiated is preferably 200 nm to 430 nm.

The thickness of the cholesteric liquid crystal layer (a sum of the thickness of a plurality of layers in the case of the plurality of layers being laminated) is preferably 1 $\mu m$ to 150 $\mu m$, more preferably 2 $\mu m$ to 100 $\mu m$, and still more preferably 5 $\mu m$ to 50 $\mu m$.

(Support)

The film of the present invention may contain a support. The support is not particularly limited, and a plastic film is preferably used. It is preferable that the support is transparent and has a low birefringence. Examples of the plastic film include polyester such as polyethylene terephthalate (PET), an acrylic resin, an epoxy resin, polyurethane, polyamide, polyolefin, a cycloolefin polymer, a cellulose derivative, and silicone. The film thickness is approximately 5 µm to 1,000 µm, preferably 10 µm to 250 µm, and more preferably 15 µm to 90 µm.

For the manufacture of the cholesteric liquid crystal layer, an ordinary support is used, in which the support may be delaminated in the film for thermal compression bonding of the present invention. That is, for example, by laminating a cholesteric liquid crystal layer formed on a support onto another base material and delaminating the support at the time of the manufacture of a cholesteric liquid crystal layer to obtain a film, the characteristics such as heat resistance of a support can be appropriately selected for the manufacture of a cholesteric liquid crystal layer and the optical properties and the like of the film cannot be affected by the properties of the support.

In addition, the support may be a temporary support to be delaminated during or after producing a molded article using a film for thermal compression bonding.

(Alignment Layer)

The film of the present invention may contain an alignment layer for alignment of the liquid crystal compound. The alignment film can be provided by a means such as a rubbing treatment of an organic compound or a polymer (resins such as polyimide, polyvinyl alcohol, polyester, polyarylate, polyamideimide, polyether imide, polyamide, and modified polyamide), oblique deposition of an inorganic compound, formation of a layer having a microgroove, or accumulation of an organic compound (such as ω-tricosanoic acid, dioctadecylmethylammonium chloride, and methyl stearylate) by a Langmuir-Blodgett method (LB film). Further, an alignment film that generates alignment function by application of an electric field, application of a magnetic field or light irradiation is also known. Among these, an alignment film to be farmed by a rubbing treatment of a polymer is particularly preferable. The rubbing treatment can be carried out by unidirectionally rubbing several times the surface of a polymer layer with paper or cloth.

The thickness of the alignment layer is preferably 0.01 µm to 5 µm, and more preferably 0.05 µm to 2 µm.

The liquid crystal composition may be coated on a support surface having no alignment layer provided thereon or on a surface of a support which has been subjected to a rubbing treatment.

In the case where the support is a temporary support, the alignment layer may or may not be delaminated together with the support.

(Adhesive Layer)

The film for thermal compression bonding of the present invention may contain an adhesive layer. Examples of the adhesive constituting the adhesive layer include resin adhesives such as a thermosetting adhesive, a thermoplastic adhesive, and a pressurizing adhesive. As the resin, at least one which is appropriately selected from, for example, an acryl-based resin, a vinyl chloride-based resin, a vinyl acetate-based resin, a vinyl chloride-vinyl acetate-based copolymerization resin, a styrene-acryl-based copolymerization resin, a polyester-based resin, a polyamide-based resin, an olefin-based resin, and the like is used. One kind or two or more kinds of the resins thus selected may be mixed and used. Further, if desired, a release film may be provided on the adhesive layer. The release film is provided in order to protect the adhesive layer and delaminated before being bonded to a molded article.

The thickness of the adhesive layer is preferably 0.1 µm to 6 µm, and more preferably 1 µm to 4 µm.

(Application of Film for Thermal Compression Bonding)

With the film for thermal compression bonding of the present invention, a processing including a step of heating or pressurizing, or a step of heating and pressurizing can be accomplished. In particular, the film for thermal compression bonding of the present invention can be used as a bonding film which will be transferred onto or laminated on a resin product or a metal product under heating and pressurizing. Examples of such a processing method include a method including reheating and pressurizing the film for thermal compression bonding, such as vacuum molding, pressurized air molding, matched die molding, and in-mold molding.

Vacuum molding, pressurized air molding, or matched die molding is a method in which a plate of, for example, a resin, a metal, or the like is pressurized with a mold or pressurized air under heating, thereby obtaining a desired shape, but in the case where the film for thermal compression bonding of the present invention is adhered to the plate in advance with an adhesive or the film for thermal compression bonding of the present invention contains an adhesive layer, a product formed on the plate can be provided with the decoration or properties based on the film for thermal compression bonding of the present invention by carrying out adhesion by the adhesive layer, and then pressurizing under heating.

An in-mold molding process is a method in which a plastic film is inserted into a mold of an injection molding device, and then if desired, an adhesive is bonded to the side for resin injection to inject the resin into the mold of the injection molding device, followed by heating and compressing, to obtain a resin molded article having a plastic film laminated on or transferred onto the surface thereof. By using the film for thermal compression bonding of the present invention as a plastic film, a product formed of the resin can be provided with the decoration or properties based on the film for thermal compression bonding of the present invention. Alternatively, in the case where film for thermal compression bonding of the present invention contains an adhesive layer, the in-mold molding process may be carried out by allowing the adhesive layer to face the side for resin injection.

Examples of the adhesive to be used in the processing method include the same ones as exemplified for the adhesive used in the adhesive layer above.

(Molded Article)

As a molded article, products using the selective reflection characteristics based on the properties of the cholesteric liquid crystal layer in the film for thermal compression bonding of the present invention can be exemplified, and examples thereof include a filter for a sensor, a half mirror, a heat-insulating sheet, a UV-cut sheet, a decorative sheet, a circularly-polarized light filter, a light scattering sheet, and a reflection type screen.

As a resin for a resin product to which the film for thermal compression bonding of the present invention is transferred, an acrylic resin or polycarbonate is preferable.

EXAMPLES

The present invention will be described in more detail with reference to Examples. The materials, the reagents, the amounts of materials, the ratios, and the operations, shown in Examples below, can be appropriately modified within the range not while departing from the gist of the present invention. Accordingly, the scope of the present invention is not limited to the following Examples.

<Manufacture of Film>

In each of Examples and Comparative Examples, a coating liquid R and a coating liquid L, which had the compositions shown, respectively, in Tables 1 and 2, below were used. The coating liquids R and L were prepared such that cholesteric liquid crystal layers manufactured together had a reflection central wavelength of 600 nm.

TABLE 1

Table of Composition of Coating Liquid R

| Material (type) | Name of material (manufacturer) | Prescribed amount |
|---|---|---|
| Rod-like liquid crystalline compound 1 (major liquid crystal) | Compound 1A or compound 1B shown below | 80 parts by mass |
| Rod-like liquid crystalline compound 2 (minor liquid crystal) | Compound 2A or compound 2B shown below | 20 parts by mass |
| Chiral agent for right twisting | LC-756 (BASF) | 4.95 parts by mass |
| Polymerization initiator | Irgacure 819 (BASF) | 4 parts by mass |
| Alignment control agent | Compound 3 shown below | 0.1 parts by mass |
| Polymerizable monomer | Any one (refer to Table 4) of: A-TMMT (tetrafunctional, Shin-Nakamura Chemical Co., Ltd.), TMPEOTA (trifunctional, Daicel•Allnex Ltd.), and NK Ester A-600 (bifunctional, Shin-Nakamura Chemical Co., Ltd.) | Refer to Table 4 (added with respect to the parts by mass of liquid crystals) |
| Solvent | 2-Butanone (Wako Pure Chemicals) | 170 parts by mass |

TABLE 2

Table of Composition of Coating Liquid L

| Material (type) | Name of material (manufacturer) | Prescribed amount |
|---|---|---|
| Rod-like liquid crystalline compound 1 (major liquid crystal) | Compound 1A or compound 1B shown below | 80 parts by mass |
| Rod-like liquid crystalline compound 2 (minor liquid crystal) | Compound 2A or compound 2B shown below | 20 parts by mass |
| Chiral agent for left twisting | Compound 4 shown below | 7.81 parts by mass |
| Polymerization initiator | Irgacure 819 (BASF) | 4 parts by mass |
| Alignment control agent | Compound 3 shown below | 0.1 parts by mass |
| Polymerizable monomer | Any one (refer to Table 4) of: A-TMMT (tetrafunctional, Shin-Nakamura Chemical Co., Ltd.), TMPEOTA (trifunctional, Daicel•Allnex Ltd.), and NK Ester A-600 (bifunctional, Shin-Nakamura Chemical Co., Ltd.) | Refer to Table 4 (added with respect to the parts by mass of liquid crystals) |
| Solvent | 2-Butanone (Wako Pure Chemicals) | 175 parts by mass |

Rod-like liquid crystal compound 1: Compound 1A (bi-functional)

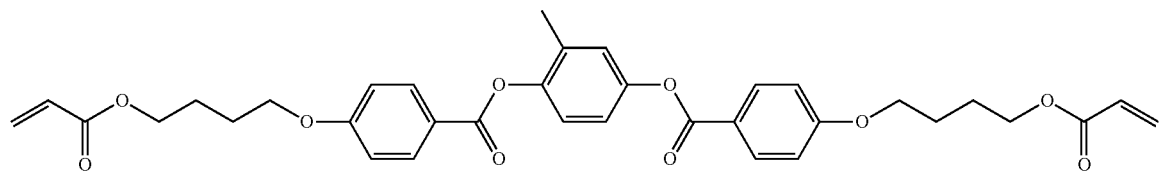 [SMILES: C=CC(=O)OCCCCOc1ccc(C(=O)Oc2ccc(OC(=O)c3ccc(OCCCCOC(=O)C=C)cc3)c(C)c2)cc1]

Rod-like liquid crystal compound 1: Compound 1B (tri-functional)

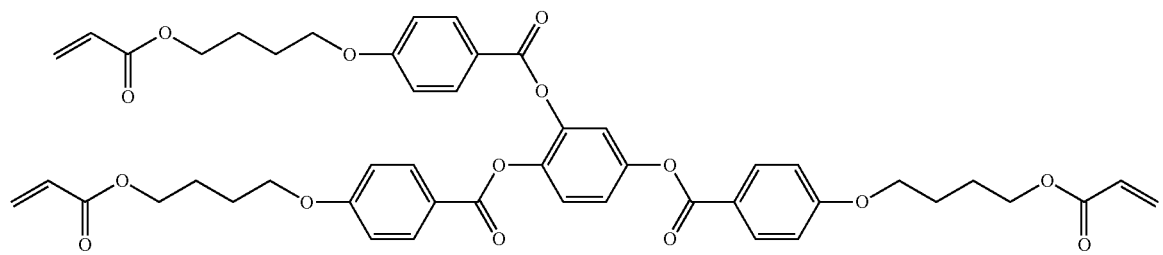 [SMILES: C=CC(=O)OCCCCOc1ccc(C(=O)Oc2ccc(OC(=O)c3ccc(OCCCCOC(=O)C=C)cc3)c(OC(=O)c3ccc(OCCCCOC(=O)C=C)cc3)c2)cc1]

Rod-like liquid crystal compound 2: Compound 2A (monofunctional)

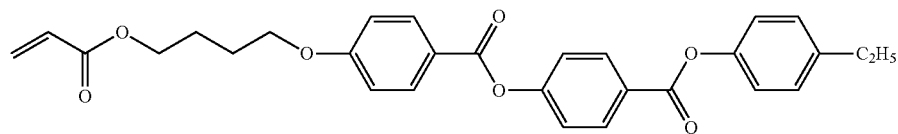 [SMILES: C=CC(=O)OCCCCOc1ccc(C(=O)Oc2ccc(C(=O)Oc3ccc(CC)cc3)cc2)cc1]

Rod-like liquid crystal compound 2: Compound 2B (bi-functional)

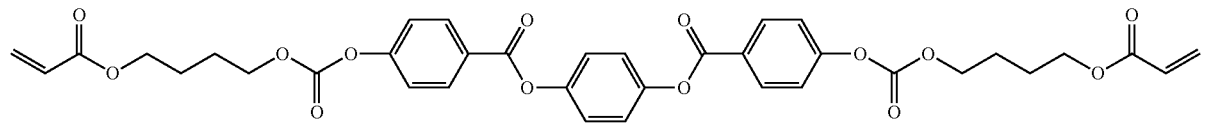 [SMILES: C=CC(=O)OCCCCOC(=O)Oc1ccc(C(=O)Oc2ccc(OC(=O)c3ccc(OC(=O)OCCCCOC(=O)C=C)cc3)cc2)cc1]

Alignment control agent: Compound 3 (the compound described in JP2005-99248A)

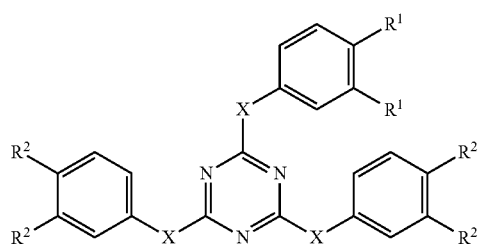

| $R^1$ | $R^2$ | X |
|---|---|---|
| $O(CH_2)_2O(CH_2)_2(CF_2)_6F$ | $O(CH_2)_2O(CH_2)_2(CF_2)_6F$ | NH |

Chiral agent for left twisting: Compound 4

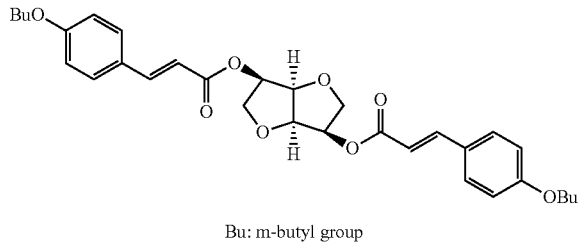

Bu: m-butyl group

Polymerizable monomer: A-TMMT (tetrafunctional)

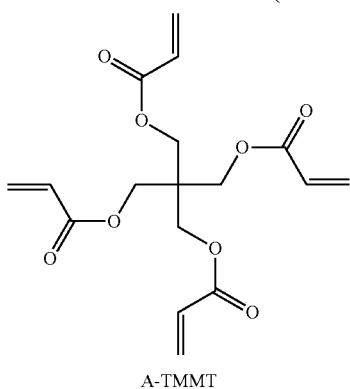

A-TMMT

Polymerizable monomer: TMPEOTA (trifunctional)

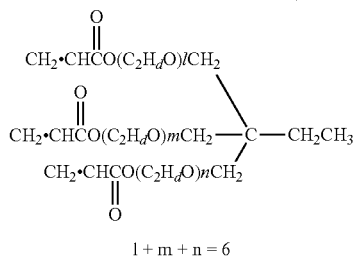

$l + m + n = 6$

Polymerizable monomer. NK Ester A-600 (bifunctional)

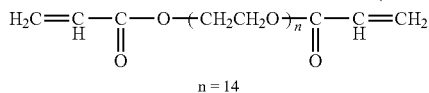

$n = 14$

TABLE 3

<Preparation of Adhesive> Table of Composition of Adhesive

| Material (type) | Name of material (manufacturer) | Prescribed amount |
|---|---|---|
| Adhesive | LIS-825 (Toyo Ink Co., Ltd.) | 100 parts by mass |
| Curing agent | LCR-901 (Toyo-Morton, Ltd.) | 10 parts by mass |
| Solvent | Ethyl acetate | 80 parts by mass |

The manufacture of the films in Examples, Reference Examples, and Comparative Examples (Table 4) were carried out in the following manner. Further, in the coating liquid R and the coating liquid L, used for the manufacture of the same film, the films were manufactured such that the kinds and the addition amounts of the rod-like liquid crystalline compounds 1 and 2, and the kinds and addition amount of the polymerizable monomers were the same, respectively.

A PET film manufactured by Fujifilm Co., Ltd. (having no undercoat layer, thickness: 75 μm) was subjected to a rubbing treatment (Rayon cloth, pressure: 9.8 kPa (0.1 kgf/cm$^2$), rotation speed: 1,000 rpm, transportation speed: 10 m/min, times: one round trip).

The rubbed surface of the PET film was coated with the coating liquid R such that the thickness of the film after drying became 3.5 μm using a wire bar at room temperature. The resultant was dried for 30 seconds at room temperature to remove the solvent, and then the residue was heated for 2 minutes in an atmosphere at 125° C. and then allowed to enter a state of a cholesteric liquid crystal phase at 95° C. Subsequently, the resultant was irradiated with UV for 6 seconds to 12 seconds at an output of 60% using an electrodeless lamp "D valve" (90 mW/cm$^2$) (manufactured by Fusion UV systems Inc.), and the cholesteric liquid crystal phase was fixed, thereby forming a cholesteric liquid crystal layer. After cooling to room temperature, the coating liquid L was coated on the surface of the obtained liquid crystal layer in the same manner as with the coating liquid R, followed by drying, heating, and UV irradiation in the same manner as above, thereby forming a second layer and obtaining a film having two cholesteric liquid crystal layers on the PET film substrate.

<In-Mold Molding Method>

The adhesive in Table 3 was coated on the cholesteric liquid crystal layer such that the thickness of the film after drying became 2 μm using a wire bar at room temperature. The resultant was dried for 2 minutes at room temperature to remove the solvent, and then the residue was cut to a size of 80 mm×80 mm and inserted into a SUS-made mold (a radius of curvature R400) such that the coated surface of the adhesive was on the resin side. A polycarbonate resin was flowed into the mold and molded (a mold temperature: 110° C., a resin temperature: 310° C., a pressure: 13.7 MPa, and a time: 1 minute) to obtain a molded article attached with a film having a size of 80 mm×80 mm and a thickness of 5 mm. Further, the PET was delaminated from the molded article to obtain a molded article onto which the cholesteric liquid crystal layer is transferred.

<Evaluation Conditions>

Wavelength shift amount: The central reflection wavelength before and after the film transfer was measured by a spectrophotometer (Model V-670, manufactured by JASCO Co., Ltd.). (If the wavelength shift (shortened wave) of the central wavelength is 10 nm or more, it is not usually preferable for practical use.)

Cracks: Visually observed.

TABLE 4

| | Characteristics of liquid crystal film | | | | | |
|---|---|---|---|---|---|---|
| | Polymerizable liquid crystal | | | Polymerizable monomer (with respect to the mass of liquid crystals) | Evaluation results of film after transfer | |
| | Major (80%) | Minor (20%) | Type | Addition amount [%] | Wavelength shift amount (nm) | Breakage |
| Comparative Example 1 | Chemical Formula 1A (bifunctional) | Chemical Formula 2A (monofunctional) | — | — | 15.3 | Not broken |

TABLE 4-continued

Characteristics of liquid crystal film

| | Polymerizable liquid crystal | | Polymerizable monomer (with respect to the mass of liquid crystals) | | Evaluation results of film after transfer | |
|---|---|---|---|---|---|---|
| | Major (80%) | Minor (20%) | Type | Addition amount [%] | Wavelength shift amount (nm) | Breakage |
| Reference Example 1 | Chemical Formula 1A (bifunctional) | Chemical Formula 2A (monofunctional) | A-TMMT (tetrafunctional) | 0.2 | 9.7 | Not broken |
| Example 2 | Chemical Formula 1A (bifunctional) | Chemical Formula 2A (monofunctional) | A-TMMT (tetrafunctional) | 2 | 2.7 | Not broken |
| Reference Example 3 | Chemical Formula 1A (bifunctional) | Chemical Formula 2A (monofunctional) | A-TMMT (tetrafunctional) | 10 | 1.5 | Not broken |
| Comparative Example 2 | Chemical Formula 1A (bifunctional) | Chemical Formula 2A (monofunctional) | A-TMMT (tetrafunctional) | 12 | 1.1 | Broken |
| Comparative Example 3 | Chemical Formula 1A (bifunctional) | Chemical Formula 2B (bifunctional) | — | — | 10.6 | Not broken |
| Reference Example 4 | Chemical Formula 1A (bifunctional) | Chemical Formula 2B (bifunctional) | A-TMMT (tetrafunctional) | 0.2 | 4.2 | Not broken |
| Example 5 | Chemical Formula 1A (bifunctional) | Chemical Formula 2B (bifunctional) | A-TMMT (tetrafunctional) | 6 | 1.6 | Not broken |
| Comparative Example 4 | Chemical Formula 1A (bifunctional) | Chemical Formula 2B (bifunctional) | A-TMMT (tetrafunctional) | 10 | None | Broken |
| Comparative Example 5 | Chemical Formula 1B (trifunctional) | Chemical Formula 2A (monofunctional) | A-TMMT (tetrafunctional) | 0.2 | None | Broken |
| Comparative Example 6 | Chemical Formula 1B (trifunctional) | Chemical Formula 2A (monofunctional) | — | — | 1.2 | Broken |
| Comparative Example 7 | Chemical Formula 1A (bifunctional) | Chemical Formula 2A (monofunctional) | TMPEOTA (trifunctional) | 0.2 | 10.8 | Not broken |
| Example 6 | Chemical Formula 1A (bifunctional) | Chemical Formula 2A (monofunctional) | TMPEOTA (trifunctional) | 0.3 | 9.9 | Not broken |
| Reference Example 7 | Chemical Formula 1A (bifunctional) | Chemical Formula 2A (monofunctional) | TMPEOTA (trifunctional) | 10 | 1.9 | Not broken |
| Comparative Example 8 | Chemical Formula 1A (bifunctional) | Chemical Formula 2A (monofunctional) | A-600 (bifunctional) | 12 | 15.0 | Not broken |

In the tables, "%" is "% by mass".

What is claimed is:

1. A method for producing a molded article, comprising preparing a film including a cholesteric liquid crystal layer formed by curing a liquid crystal composition including a polymerizable rod-like liquid crystal compound, a chiral agent, and a polymerizable monomer;
inserting the film into a mold of an injection molding device;
injecting a resin into the mold of the injection molding device; and
heating and compressing the film and the resin with the injection molding device,
wherein
the resin is polycarbonate,
the liquid crystal composition includes as the polymerizable rod-like liquid crystal compound a monofunctional rod-like liquid crystal compound having one polymerizable group and a bifunctional rod-like liquid crystal compound having two polymerizable groups, or includes as the polymerizable rod-like liquid crystal compound two or more bifunctional rod-like liquid crystal compounds having two polymerizable groups,
the polymerizable monomer has three or more polymerizable groups, and
the polymerizable monomer is contained in an amount of 0.3% by mass to 6.0% by mass with respect to the total mass of the polymerizable rod-like liquid crystal compounds.

2. The production method according to claim 1, wherein the film further comprises a support, wherein the support is a plastic film selected from the group consisting of polyester, an acrylic resin, an epoxy resin, polyurethane, polyamide, polyolefin, a cycloolefin polymer, a cellulose derivative, and silicone.

3. The production method according to claim 2, wherein the support is polyethylene terephthalate.

4. The production method according to claim 2, wherein the film consists of the cholesteric liquid crystal layer and the support.

5. The production method according to claim 1, wherein the film further comprises an alignment layer, wherein the alignment layer is selected from the group consisting of polyimide, polyvinyl alcohol, polyester, polyarylate, polyamideimide, polyether imide, polyamide, and modified polyamide.

6. The production method according to claim 5, wherein the film consists of the support, the alignment layer, and the cholesteric liquid crystal layer.

7. The production method according to claim 1, wherein the chiral agent is a left-turning or right-turning chiral agent having an HTP of 30 $\mu m^{-1}$ or more.

8. The production method according to claim 1, wherein the film further comprises the adhesive layer, wherein the adhesive layer is directly in contact with the cholesteric liquid crystal layer.

9. The production method according to claim 8, wherein the adhesive layer consists of a resin adhesive selected from a group consisting of a thermosetting adhesive, a thermoplastic adhesive, and a pressurizing adhesive.

10. The production method according to claim 1, wherein the film is prepared to have an adhesive coated on at least one surface.

11. The production method according to claim 10, wherein the adhesive consists of a resin adhesive selected from a group consisting of a thermosetting adhesive, a thermoplastic adhesive, and a pressurizing adhesive.

12. The production method according to claim 10, wherein
the film having the adhesive coated thereon is inserted into the mold of the injection molding device; and
the resin is injected into the mold of the injection molding device to be directly applied on the surface side having the adhesive coated thereon.

* * * * *